(12) United States Patent
Devi

(10) Patent No.: US 7,346,056 B2
(45) Date of Patent: Mar. 18, 2008

(54) OPTIMIZING PATH SELECTION FOR MULTIPLE SERVICE CLASSES IN A NETWORK

(75) Inventor: Bharathi B. Devi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 10/061,426

(22) Filed: Feb. 1, 2002

(65) Prior Publication Data

US 2003/0147400 A1    Aug. 7, 2003

(51) Int. Cl.
*H04L 12/28* (2006.01)
(52) U.S. Cl. ........................ 370/392; 370/400
(58) Field of Classification Search ............. None
See application file for complete search history.

(56) References Cited

U.S. PATENT DOCUMENTS

| | | | | |
|---|---|---|---|---|
| 5,233,604 A * | 8/1993 | Ahmadi et al. | ............ | 370/238 |
| 5,732,072 A | 3/1998 | Thanner et al. | ............ | 370/255 |
| 5,940,372 A * | 8/1999 | Bertin et al. | ............ | 370/238 |
| 5,995,503 A | 11/1999 | Crawley et al. | ............ | 370/351 |
| 6,094,687 A | 7/2000 | Drake, Jr. et al. | ........ | 709/241 |
| 6,104,700 A | 8/2000 | Haddock et al. | ........... | 370/235 |
| 6,122,759 A | 9/2000 | Ayanoglu et al. | ............ | 714/57 |
| 6,201,810 B1 | 3/2001 | Masuda et al. | ............ | 370/395 |
| 6,256,309 B1 | 7/2001 | Daley et al. | ............... | 370/395 |
| 6,262,976 B1 | 7/2001 | McNamara | ................ | 370/254 |
| 6,289,382 B1 | 9/2001 | Bowman-Amuah | ........ | 709/226 |
| 6,301,244 B1 | 10/2001 | Huang et al. | ............... | 370/351 |
| 6,321,271 B1 | 11/2001 | Kodialam et al. | ......... | 709/241 |
| 6,400,681 B1 * | 6/2002 | Bertin et al. | ................ | 370/218 |
| 6,538,991 B1 * | 3/2003 | Kodialam et al. | ......... | 370/229 |
| 6,563,798 B1 * | 5/2003 | Cheng | ....................... | 370/255 |
| 6,594,268 B1 * | 7/2003 | Aukia et al. | ............... | 370/400 |
| 6,633,544 B1 * | 10/2003 | Rexford et al. | ............ | 370/238 |
| 6,687,229 B1 * | 2/2004 | Kataria et al. | ............. | 370/238 |
| 6,785,260 B1 * | 8/2004 | Goyal et al. | ............... | 370/351 |
| 6,842,463 B1 * | 1/2005 | Drwiega et al. | ............ | 370/468 |
| 6,934,249 B1 * | 8/2005 | Bertin et al. | ............... | 370/218 |
| 7,168,044 B1 * | 1/2007 | Mao | .......................... | 715/736 |
| 2002/0018264 A1 * | 2/2002 | Kodialam et al. | ......... | 359/128 |

* cited by examiner

*Primary Examiner*—Edan Orgad
*Assistant Examiner*—Jung Park
(74) *Attorney, Agent, or Firm*—Baker Botts L.L.P.

(57) ABSTRACT

A method for routing traffic in a network includes determining topology information for the network and determining traffic demands for multiple service classes. The method further includes determining an objective function for an optimization problem using the topology information and demands, and determining a solution to that specifies a network path for each demand.

18 Claims, 3 Drawing Sheets

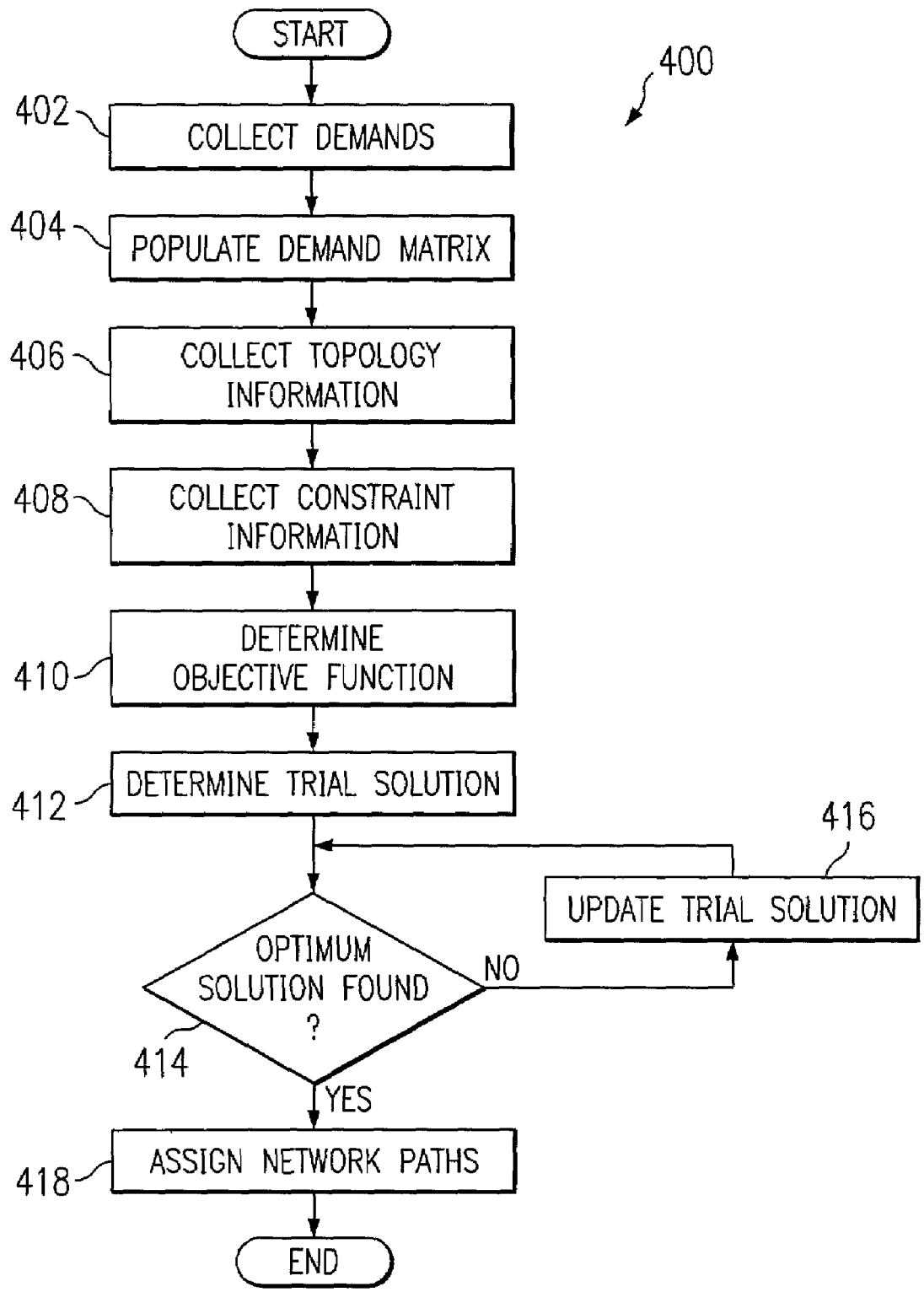

OPTIMIZING PATH SELECTION FOR MULTIPLE SERVICE CLASSES IN A NETWORK

TECHNICAL FIELD OF THE INVENTION

This invention relates in general to telecommunications, and more particularly to a method and system for optimizing path selection for multiple service classes in a network.

BACKGROUND OF THE INVENTION

Telecommunication systems continue to carry more and different kinds of traffic over their networks. Certain types of traffic require a high degree of reliability, so that few or no packets are lost in transit. Other types of traffic may be sensitive to timing, so that some packets may be lost, but the packets that are received need to arrive on time. Furthermore, some traffic may be order sensitive, while other traffic may be communicated asynchronously. As demand increases, telecommunication systems must adapt to handle increasing amounts and types of traffic.

SUMMARY OF THE INVENTION

In accordance with the present invention, a method and system for optimizing network path selection for multiple service classes in a network is disclosed. In accordance with the present invention, the disadvantages and problems associated with previous methods of optimization have been substantially reduced or eliminated. In particular, certain embodiments of the present invention have the advantage of allowing simultaneous optimization for several service classes.

In accordance with one embodiment of the present invention, a method for routing traffic in a network includes determining topology information for a network and determining demands for multiple service classes. The method further includes determining an objective function using the topology information and the demands, and determining a solution that specifies a network path for each demand using the objective function.

In accordance with another embodiment of the present invention, a server includes a memory and a processor. The memory stores topology information of a network along with traffic demands for multiple service classes. The processor determines an objective function for an optimization problem using the topology information and the demands, determines a solution to the optimization problem, and determines a network path for each demand using the solution.

Technical advantages of certain embodiments of the present invention include load balancing. The objective function may include a load balancing term so that the optimization accounts for load balancing among many links. This results in a more uniform distribution of traffic among links, thus providing more efficient use of network resources.

Other technical advantages of certain embodiments of the present invention include less dependency on individual links. Unlike previous systems that always direct traffic to the shortest available path, certain embodiments of the present invention allow more flexible path determination including multiple alternative routes. Thus, when a link fails, the traffic can often be redirected more easily, and less traffic overall is disrupted by the link failure.

Additional technical advantages of certain embodiments of the present invention include automatic fail-over path determination. Certain embodiments of the present invention include detection of component failure in the network and automatic recalculation of network paths in response to the failure. This allows quick recovery from component failure. Particular embodiments of the invention may include some, all or none of the enumerated technical advantages. These and other technical advantages of certain embodiments of the present invention will be apparent from the following figures, description and claims.

BRIEF DESCRIPTION OF THE DRAWINGS

For a more complete understanding of the present invention and its advantages, reference is now made to the following description, taken in conjunction with the accompanying drawings, in which:

FIG. 4 is a flow chart illustrating the steps of a method for optimizing path selection in a network.

DETAILED DESCRIPTION OF THE INVENTION

Figure 1:
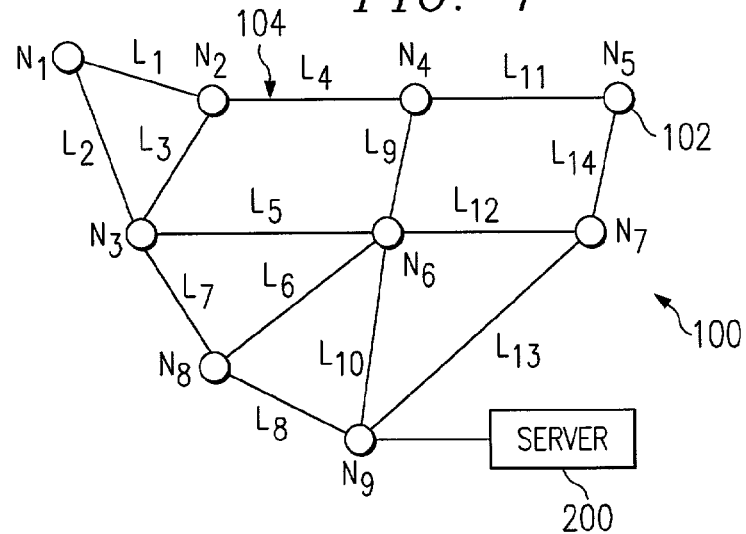
FIG. 1 illustrates a network including nodes, links, and an optimization server.

FIG. 1 illustrates a network 100 that includes nodes 102, links 104, and an optimization server 200 that assigns paths between nodes 102 in network 100. "Nodes" refer to any hardware and/or software that sends and/or receives information in network. Nodes 102 may include switches, endpoints, routers, servers, clients, or any other suitable network component. Nodes 102 are denoted by "N", and numbered by subscripts. A "circuit" refers to any connection between a node 102 that is the source of information and a node 102 that is the final destination of the information. A "path" refers to the series of links 104 in a circuit.

Links 104 represent any physical and/or logical connection between nodes 102. Links 104 may include cables, fiber optics, wireless links, or any other suitable method for communicating information between nodes 102. A single logical link 104 may represent more than one physical link, in which case the logical link 104 is known as an "aggregated link." Links are denoted by "L", and numbered with subscripts.

Optimization server 200 performs various provisioning tasks including assigning circuits between nodes 102. Server 200 represents any hardware and/or software configured to process information and perform tasks such as selecting circuits between nodes 102, and communicating instructions to nodes 102 to send traffic to particular links 104. Server 200 may communicate with one or all of nodes 102 using network 100. Alternatively, server 200 may be an out-of-network server 200 that determines an optimal path selection, which is then used to provision paths manually. Network 100 contemplates any suitable connectivity of server 200 to nodes 102 to perform in-band, out-of-band, flow-through or other suitable provisioning.

In operation, network 100 communicates packets, frames, cells, or other segments of information (generally referred to as "packets") between nodes 102. Depending on the type of information, packets may be communicated synchronously, asynchronously, sporadically, sequentially, randomly or in any other suitable arrangement. Traffic is divided into "service classes" that specify conditions required for the traffic to be communicated effectively. Such conditions or parameters may include low latency, available bit rate (ABR), constant bit rate (CBR), error rate, bandwidth guarantees, rate of packet loss, "best effort" (no delay guarantees and possible overbooking), or any other suitable measure of network effectiveness, including customized measurements for particular types of traffic. For example, voice traffic may require a latency ceiling, since excessive latency impairs the experience of voice communication. On the other hand, the occasional voice packet may be dropped without impairing voice quality. In contrast, data traffic may be relatively insensitive to latency, but particular applications may be quite sensitive to packet loss. Since voice and data traffic have different requirements to be communicated effectively, voice traffic and data traffic would be assigned to different service classes.

Server 200 determines a path for traffic of a particular service class between a source node 102 and destination node 102. One technique for path selection first assigns traffic of the highest service class to the shortest available path. Once the paths for the highest service class are assigned, the technique assigns lesser service classes in order to the shortest of the remaining network paths. This approach may assign all of the traffic of the highest class between particular nodes to a single path, which does not necessarily result in a balanced traffic load. Furthermore, should one of the links on the shortest path fail, the entire optimization routine must be re-run and traffic re-assigned. Server 200 simultaneously develops an assignment for more than one service class, therefore allowing the resulting path assignment to be load balanced and to include redundant paths that can be used as backups should particular links 104 fail.

To simultaneously optimize path selection for service classes, server 200 collects multiple demands, each for a requested amount of traffic of a particular class between a source node and a destination node. Server 200 also collects network topology information, which may be collected directly from network 100. Network 100 contemplates any suitable technique to allow server 200 to collect demands and topology information. Server 200 may also collect constraints, representing limits on the path assignments for particular types of traffic.

Server 200 uses the collected information to determine an assigned path for each demand. Server 200 may perform path assignments during initial provisioning and may also perform path assignment at the time information is collected in response to a change in demands and/or topology information. Assigned paths may be provisioned manually or automatically using in-band, out-of-band, flow-through or any other suitable provisioning techniques.

Figure 2:
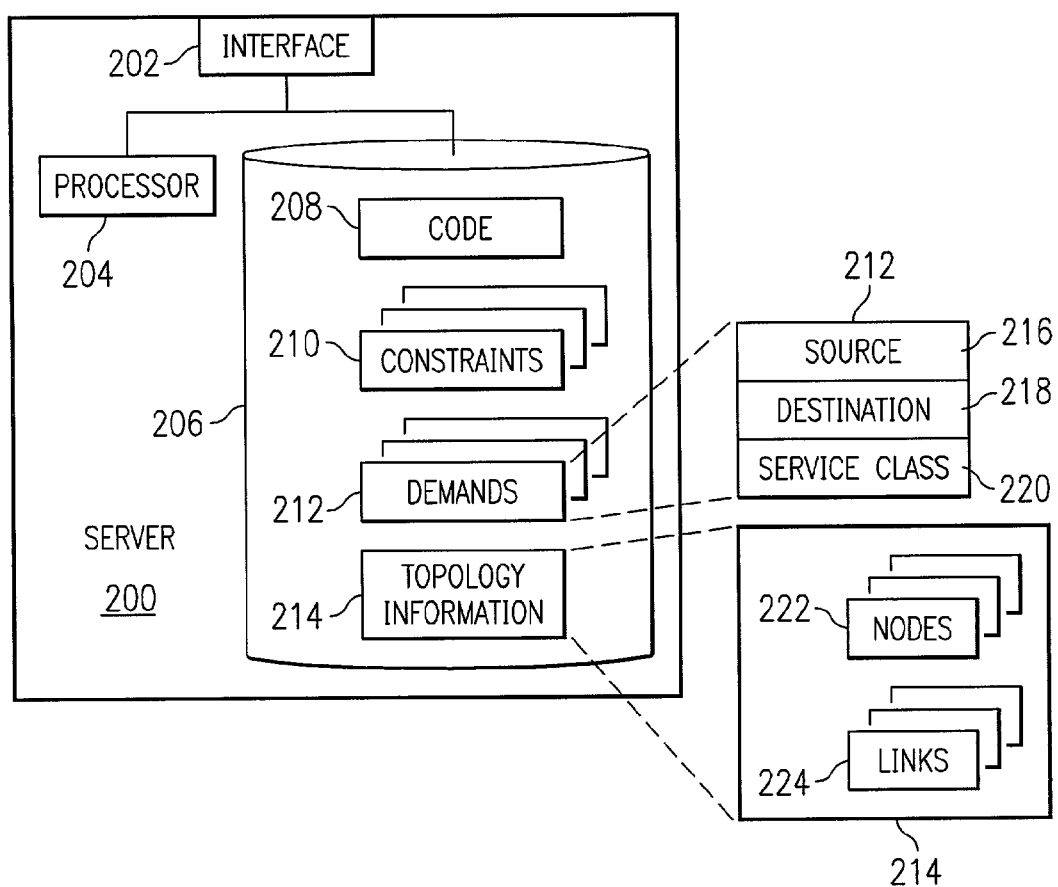
FIG. 2 illustrates the optimization server of FIG. 1 in more detail.

FIG. 2 shows server 200 in more detail. Server 200 includes an interface 202, a processor 204, and memory 206. In a particular embodiment, interface 202 allows server 200 to communicate with components of network 100 to gather topology information and/or demands, and to provision network 100 based on optimization determinations. Interface 202 may be any port, real or virtual, logical or physical, that allows server 200 to communicate with network 100. Interface 202 also contemplates a user interface 202 that allows server 200 to communicate with a user. The user may enter information using a graphical user interface (GUI) or other suitable input/output hardware and/or software and may receive optimized path assignments from server 200, which may then be implemented in network 100.

Processor 204 represents a microprocessor, microcontroller, digital signal processor (DSP), or any other suitable hardware and/or software configured for processing information. Processor 204 performs all calculations necessary to provide optimum path selection, as described below. Processor 204 may access information received from interface 202, and may store and retrieve information from memory 206.

Memory 206 may include any memory, volatile or non-volatile, local or remote, that stores information. Memory may include magnetic media, optical media, random access memory (RAM), read-only memory (ROM), CD-ROMs, DVD-ROMs, removable media, or any other suitable form of information storage. In a particular embodiment, memory 206 stores code 208 executed by processor, a set of network constraints 210, information about demands 212, and information about the topology of network 100.

Code 208 includes an optimization routine that allows optimization of path selection using data stored in memory 206. In a particular embodiment, code 208 also includes instructions for collecting information from network 100 automatically to perform updates of topology information 214. Code 208 also contemplates instructions for receiving, aggregating and storing demands. Code 208 may also include instructions for provisioning, such as instructions for generating a message to components of network 100 for flow-through provisioning. The optimization algorithm of code 208 is described in greater detail in conjunction with FIGS. 3 and 4 below.

Constraints 210, also known as "policies," are restrictions on types of traffic that may be carried over certain links 104 of network 100. For example, a constraint 210 may include assigning colors (e.g., red, blue, and green) to links 104 to indicate their reliability. Such a constraint 210 may then restrict service classes that require a high degree of reliability to particular links 104. For example, if green links 104 were considered to be virtually failure-free, server 200 may assign traffic of the service class that requires high link reliability to them. Constraints 210 may also be used to indicate capacity of links 104, restrictions on usage of links 104, or any other suitable restriction.

Demands 212 indicate demands for information to be communicated over network 100. Demands 212 are typically collected from customers and stored as they become available, but demands may also include any suitable specification of traffic requirements, whether calculated or entered manually. Demand 212 may include a source node 216 for traffic, a final destination 218 for the traffic, and the service class 220 for the traffic, which may be further subdivided by any quality-of-service (QoS) factor or value. Demands 212 of a particular service class may be aggregated among several requests demanding a particular service class between a particular source 216 and a particular destination 218, such as multiple customer demands. Thus, one demand 212 may represent the sum of several individual demands.

Topology information 214 generally characterizes network 100. For example, topology information 214 may include node information 222 and link information 224. Node information 222 may describe the availability of particular nodes 102 as well as particular information about a node 102, such as its switching capacity, supported interfaces (e.g., optical, electrical, wireless), supported protocols, assigned resources, available resources, physical configuration, or any other information describing the availability of node 102 for a particular service class. Link information 224 includes information about particular links 104, including type of link 104 (e.g., optical, electrical, wireless), reliability of link 104, error rate, total capacity, assigned bandwidth, available bandwidth or any other suitable measure of link availability. Link information 224 may be used in conjunction with constraints 210 to determine if a particular link 104 is appropriate for carrying traffic of a particular service class.

In operation, server 200 collects appropriate information from a variety of sources and stores it in memory 206. Server may collect information in a variety of ways, including receiving entries from a user, receiving messages from components of network 100, polling components of network 100 periodically, detecting failure alarms for components, receiving calculated estimates of customer demand, monitoring usage of network 100, or any other suitable method of gathering information useful for path assignment.

Processor 204 provides optimum path selections on demand. "On demand" may refer to performing the optimization calculation whenever a user indicates a need for the information. Alternatively, processor 204 may perform the calculation automatically or periodically based on time, changes to network topology, updated demands, link failure, or any other suitable condition that may require updated path assignments. Server 200 may provide assignment of paths directly to network 100, or may provide the information to the user who then assigns paths manually in network 100.

The particular server 200 described is only one of many possible embodiments of a device for optimizing path selection. Various components of server 200 may be replaced, and the functions of components may be distributed among several components of network 100 or consolidated within particular components without changing the overall operation of server 200.

Figure 3:
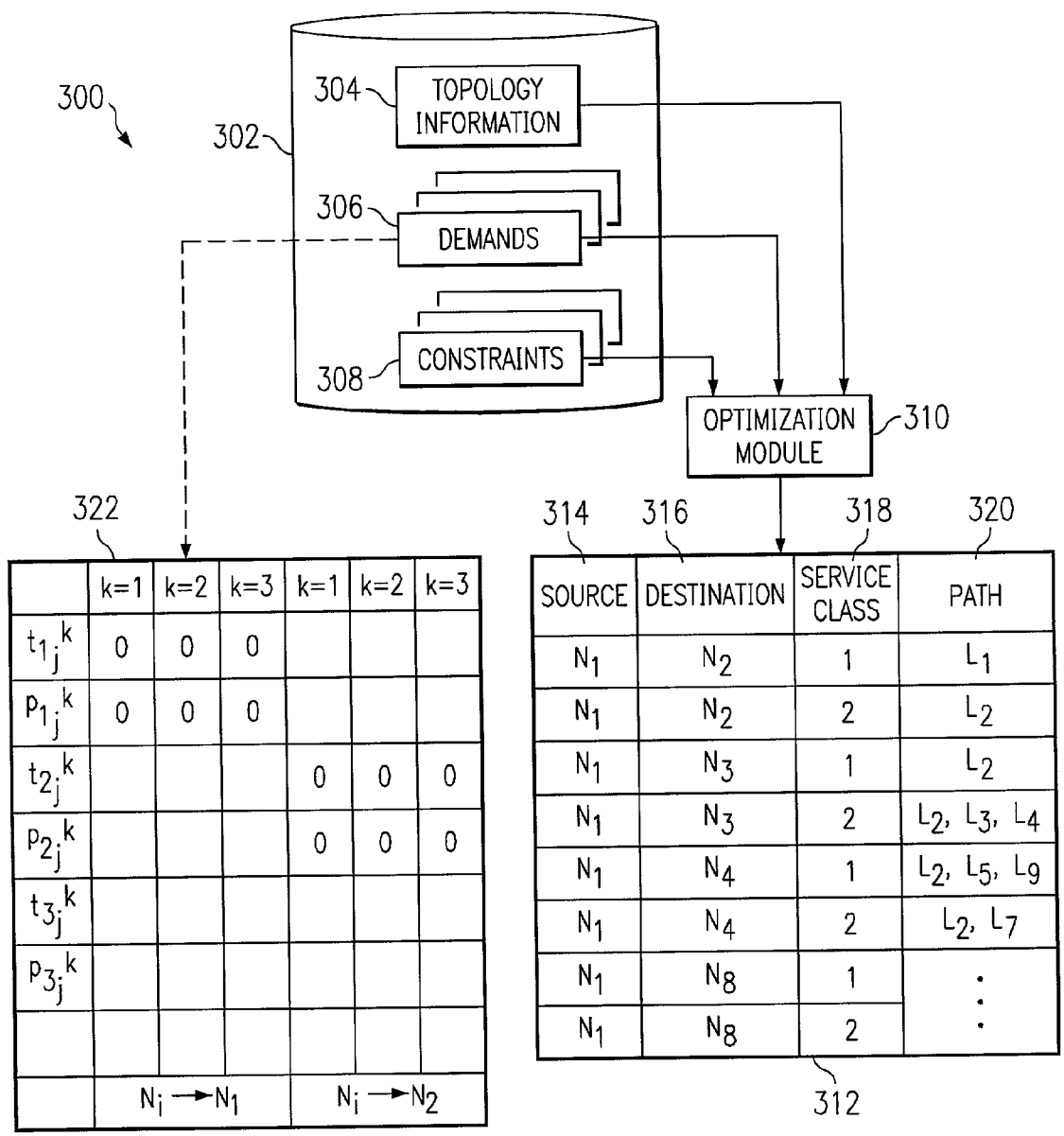
FIG. 3 illustrates conceptually a method in accordance with the present invention for providing optimum path selection in a network.

FIG. 3 shows a conceptual illustration of optimization flow 300. Information in memory 206 includes topology information 214, demands 212, and network constraints 210. Information stored in memory 206 is communicated to optimization module 310 which outputs a solution 312 assigning network paths between nodes 102. The network paths in the output describe circuits between particular nodes 102.

Optimization module 310 represents any combination of hardware and/or software for performing calculations of network paths from topology information 214, demands 212, and network constraints 210. Optimization module 310 may represent software stored as code 208 in memory 206, but may also contemplate separate hardware, software and/or memory components as well. Optimization module 310 determines an objective function that specifies an optimization problem, uses an optimization algorithm to determine a solution to the optimization problem, and determines path assignments based on the solution. The objective function may be any mathematical representation of the collected information. Optimization module 310 may employ any suitable optimization tools, including constrained integer calculations, to obtain solution 312.

In a particular embodiment, the objective function F takes the form:

$$F = M^{-2}(\sum_{ij}(L_{ij} - <L>)^2 - \sum_{ij}(C_{ij} - L_{ij}) \log (C_{ij} - L_{ij}))$$

where:
F=the objective function,
M=the number of links 104 in network 100,
$L_{ij}$=the loading from all path assignments to the link between node $N_i$ and node $N_j$ (as shown in FIG. 1),
$<L>$=the average load on all links,
$C_{ij}$=the capacity of the link between node $N_i$ and node $N_j$.
The first sum of the objective function is a load balancing term, representing the deviation between the load on any given link and the average load on all links. The second sum is a capacity constraint, which requires the loading on each link to be less than the capacity of the link. Although the capacity constraint may take the simpler form ($C_{ij}-L_{ij}$), the capacity constraint here has been expressed in the form S=T log T, an "entropy function." Because the entropy function is a way of measuring the disorder in a system, minimizing the entropy function as part of F also minimizes variations in loading from link to link, thus preventing the path assignments from being too random or lopsided.

Demands 212 may be expressed in any appropriate mathematical form as minimum bandwidth requirements for a particular class between particular nodes. In one embodiment, demands 212 are collected into a demand matrix 322. Demand matrix 322 may associate amounts of demand between particular nodes with constraints 210 on the type of traffic. For example, demand matrix 322 may take the form $[t_{ij}]$, where $t_{ij}=((t^k_{ij}, p^k_{ij}))^T$ with k=1, . . ., c (c=the number of service classes, 3 in the depicted example), $t^k_{ij}$=the amount of traffic demanded of service class k between node $N_i$ and node $N_j$, $p^k_{ij}$=the constraint information for the type of traffic. The respective amounts of traffic represent requirements for bandwidth for a particular service class, which may be minimum requirements, maximum requirements, average requirements over time, or any other suitable form of bandwidth request. For example, certain classes of traffic that are less time-sensitive may take bandwidth when it becomes available rather than requiring a constant level of bandwidth. Such requirements may be specified as constraints 210.

Constraints 210 express mathematical restrictions on possible solutions that minimize the objective function. Constraints 210 may correspond to particular requirements for particular service classes. For example, voice traffic requires low latency (time of transmission). The constraint 210 for voice traffic could be expressed as:

"from all possible paths $P_{ij}$ between node $N_i$ and node $N_j$, choose the path $P_{xy}$ with $\min(\sum_{mn} l_{pij}^{mn} d_{mn})$, where $d_{mn}$=the distance of a link $L_{mn}$ between nodes $N_m$ and $N_n$, p=the service class of voice traffic, and $l_{pij}^{mn}=\{1$ if $L_{mn}$ is in the path $P_{ij}$, and 0 if $L_{mn}$ is not in the path $P_{ij}\}$"

This constraint 210 minimizes the distance that voice traffic must travel, and therefore implicitly lowers the latency of the voice traffic. The constraint 210 may also include a bandwidth usage limit, such as 70%, to prevent excessive congestion from increasing the transmission time in a link. In cases where delay is less important, the constraint 210 might be expressed as a more tolerant condition, such as:

$$\sum_{mn} l_{pij}^{mn} h,$$

where h is the average number of "hops" (links) in a path across all service classes. This constraint 210 prevents traffic of class p from taking a path with a length longer than the average, but does not force the traffic to the shortest available path.

Constraints 210 may also incorporate information in demand matrix 322. For example, each link 104 could be assigned a "color" mn indicating the link's suitability for carrying particular classes of traffic. To maximize efficient use of available link colors, constraint 210 is expressed as:

"from all available paths $P_{ij}$ between node $N_i$ and node $N_j$, choose the path with $$\max(\sum_{mn} l_{kij}^{mn} (\sum_{mn} \times p_{ij}^k)),$$

where $$\sum_{mn} \times p_{ij}^k = \{1 \text{ if } \sum_{mn} = p_{ij}^k, \text{ and } 0 \text{ otherwise}\}"$$

so that the overall number of links matching the appropriate color is optimized.

Obviously, the examples presented are only a small selection of the many possible types of objective functions, demand requirements, topology information, and constraints. Numerous additional embodiments using multiple service classes will be apparent to one skilled in the art. Consequently, the particular embodiments described should be viewed as illustrations rather than exclusive definitions.

FIG. 3 also shows one example of a solution 312 to the optimization problem. Solution 312 may be stored in memory 206, output to a user using a graphical user interface, printed in hard copy, or otherwise output and/or stored. The notations $N_x$ and $L_x$ refer respectively to the nodes 102 and links 104 in network 100 of FIG. 1. Solution 312 includes sources 314, destinations 316, service classes 318, and paths 320. Solution 312 may be provisioned in a variety of ways, including manual provisioning, automated provisioning by a component of server 200, flow-through provisioning by sending messages to nodes 102, or any other suitable method of assigning paths in network 100.

One notable feature of solution 312 is that the path for the highest service class need not necessarily be the shortest path between two nodes 102. For example, traffic of service class 1 between node $N_1$, and node $N_4$ is carried over path 320 of link $L_2$, link $L_3$, and link $L_4$, even though link $L_1$ and link $L_4$ would be the shortest path (i.e., the least number of network hops) between node $N_1$ and node $N_4$. Furthermore, in the solution 312 shown, less traffic may be sent across link $L_1$ than link $L_2$. This is indicative of load balancing, and that even when a shorter path might be available, more traffic can go to high capacity links 104 so that overall each link 104 is using a roughly equal percentage of its capacity.

The depicted embodiment is only one example of an optimization flow. Numerous modifications will be apparent to one skilled in the art. For example, optimization flow 300 could receive additional or different information about network 100, and solution 312 could include additional or different information as well. Because of the wide range of variations available, the description of optimization flow 300 should be viewed as illustrative rather than restrictive.

FIG. 4 is a flow chart 400 illustrating a method for optimizing path selection. Server 200 collects demands 212 from customers at step 402. Server 200 uses the demands to populate a demand matrix 322 at step 404.

At step 406, server 200 collects topology information 214 for network 100. Topology information 214 may be collected automatically if server 200 is connected to network 100. Server 200 may include a network management capability to poll nodes 102 for information about the status of nodes 102 and links 104, to determine available resources, to receive alarms about component failure, or to perform any other useful information gathering techniques in network 100. In certain embodiments, server 200 detects failures in nodes 102 or links 104, and automatically redistributes traffic if necessary.

At step 408, server 200 collects network constraints 210. Constraints 210, which may be automatically generated or entered by a user, limit the range of acceptable path selections. Constraints 210 may take any appropriate form that may be expressed as a mathematical constraint on path selection solutions.

Server 200 determines an objective function based on the collected information at step 410. The objective function is a mathematical representation of network 100 and constraints 210 on traffic in network 100. The objective function specifies a single optimization problem that can be solved, with the solutions of that problem being optimal path selections for the selected service classes.

Server 200 determines a trial solution for the optimization problem specified by the objective function at step 412. A trial solution may be generated by any suitable method, including using existing shortest path algorithms. In an alternative embodiment, server 200 generates solutions randomly, checks the solutions against constraints 210 on the network, and uses any solutions that meets constraints 210 as the first trial solution. In other embodiments, the optimization method itself may include a method for determining the first guess at a solution.

Server 200 determines whether the trial solution is an optimum solution to the optimization problem specified by objective function at step 414. If the trial solution does not optimize the objective function, server 200 updates trial solution at step 416. The trial solution is updated according to rules for the particular optimization method used to bring the trial solution closer to the optimal solution. Any recursive or iterative techniques, numerical methods, or other optimization methods for determining critical points, such as global minima or maxima or local minima or maxima, may be used to bring trial solution closer to optimal solution 312. Optimal solutions 312 specifies path 320 for each demand 212 in demand matrix 322 such that each demand 212 is satisfied.

Once optimal solution 312 is determined, server 200 assigns network paths to node 102 at step 418. Server 200 may assign paths directly, or alternatively may provide path assignments to a user who then updates network paths accordingly. Optimal solution 312 may also include backups in case of link failure.

The described method is only one of many possible methods for providing optimized path selection for multiple service classes. The method and the described variations of that method should be taken as illustrative steps rather than restrictive statements. It should be understood that the steps of the described method may be performed concurrently or continuously, that particular steps of the method may be performed in a different order, and that certain steps may be added, modified or omitted without changing the overall operation of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for routing traffic in a network, comprising:
   determining topology information for a network comprising a plurality of nodes and a plurality of links between the nodes;
   determining a plurality of demands, each demand comprising a source node, a destination node, and service class for traffic between the source node and the destination node;
   determining an objective function for an optimization problem using the topology information and the demands;
   using the objective function, determining a solution to the optimization problem that simultaneously specifies a network path for each demand, wherein the objective function comprises a maximum capacity term, and wherein the solution is determined such that each link is subject to a traffic load less than a capacity of the link; and transmitting data along the network path, wherein the maximum capacity term is weighted by multiplying the maximum capacity term by a logarithmic function of the capacity.

2. The method of claim 1, wherein the step of determining a solution to the optimization problem comprises:
determining a trial solution to the optimization problem;
determining whether the trial solution is an optimized solution to the optimization problem; and
if the trial solution is not an optimized solution, updating the trial solution.

3. The method of claim 1, wherein:
the objective function further comprises constraints specifying restrictions on traffic of one or more of the service classes; and
the solution is further determined based on the constraints.

4. The method of claim 1, wherein:
the objective function comprises a load-balancing term; and
the step of determining a solution to the optimization problem includes load balancing as a factor in the determination.

5. The method of claim 1, wherein the demands are used to populate a demand matrix comprising a plurality of paired entries, one of the entries of each pair comprising a bandwidth requirement between the source node and the destination node for one of the services classes and the other entry comprising a constraint on the service class; and
the step of determining a solution uses the demand matrix.

6. A server, comprising:
a memory operable to store:
topology information of a network comprising a plurality of nodes and a plurality of links between the nodes; and
a plurality of demands, each demand associated with one of a plurality of service classes and each demand comprising a requested amount of traffic between a source node and a destination node; and
a processor operable to:
determine an objective function for an optimization problem using the topology information and the demands;
determine a solution to the optimization problem;
using the solution, determine a network path for each demand that provides sufficient traffic capacity between the source node and the destination node for the requested amount of traffic, wherein the objective function comprises a maximum capacity term, and wherein the solution is determined such that each link is subject to a traffic load less than a capacity of the link; and
transmitting data along the network path,
wherein the maximum capacity term is weighted by multiplying the maximum capacity term by a logarithmic function of the capacity.

7. The server of claim 6, wherein:
the memory is further operable to store constraints on traffic of one or more of the services classes; and
the processor is further operable to determine the solution to the optimization problem based on the constraints.

8. The server of claim 6, wherein the processor is further operable to:
detect a failure in one or more components of the network;
update the topology information in response to detecting the failure;
determine an updated objective function based on the updated topology information; and
determine an updated solution to the updated objective function.

9. The server of claim 6, wherein the processor is further operable to:
include a load-balancing term in the objective function; and
determine the solution to the optimization problem including the load-balancing term.

10. The server of claim 6, wherein:
the interface couples the server to the network; and
the server is operable to collect the topology information from components of the network automatically.

11. The server of claim 6, wherein:
the interface couples the server to the network; and
the processor is further operable to:
generate a message instructing components of the network to provision the determined network paths; and
communicate the message to the components using the interface.

12. The server of claim 6, wherein the interface is further operable to:
receive input from a user; and
display the network paths determined by the processor to the user.

13. A computer readable medium embodied with a computer program to perform the steps of:
determining topology information for a network comprising a plurality of nodes and a plurality of links between the nodes;
determining a plurality of demands, each demand comprising a requested amount of traffic between a source node and a destination node for one of a plurality of service classes;
determining an objective function for an optimization problem using the topology information and the demands;
using the objective function, determining a solution that specifies a network path for each demand, wherein the objective function comprises a maximum capacity term, and wherein the solution is determined such that each link is subject to a traffic load less than a capacity of the link; and
transmitting data along the network path,
wherein the maximum capacity term is weighted by multiplying the maximum capacity term by a logarithmic function of the capacity.

14. The logic of claim 13, wherein the step of determining a solution to the optimization problem comprises:
determining a trial solution to the optimization problem;
determining whether the trial solution is an optimized solution to the optimization problem; and
if the trial solution is not an optimized solution, updating the trial solution.

15. The logic of claim 13, wherein:
the objective function further comprises constraints specifying restrictions on traffic of one or more of the service classes; and
the solution is further determined based on the constraints.

16. The logic of claim 13, wherein:
the objective function comprises a load-balancing term; and the step of determining a solution to the optimization problem includes load balancing as a factor in the determination.

17. The logic of claim 13, wherein:

the demands are used to populate a demand matrix comprising a plurality of paired entries, one of the entries of each pair comprising a bandwidth requirement between the source node and the destination node for a particular one of the services classes and the other entry comprising a constraint on the particular service class; and the step of determining a solution uses the demand matrix.

18. A method for routing traffic in a network, comprising:

determining topology information for a network comprising a plurality of nodes and a plurality of links between the nodes;

determining a plurality of demands, each demand comprising a request for bandwidth between a source node and a destination node for one of a plurality of service classes;

determining one or more constraints, each constraint comprising a limit on traffic of one of the service classes in the network;

determining an objective function representing the network, the demands, and the constraints;

minimizing the objective function to determine a solution, the solution comprising a network path for each demand;

provisioning the network paths of the solution in the network, wherein the objective function comprises a maximum capacity term, and wherein the solution is determined such that each link is subject to a traffic load less than a capacity of the link; and transmitting data along the network path, wherein the maximum capacity term is weighted by multiplying the maximum capacity term by a logarithmic function of the capacity.

* * * * *

UNITED STATES PATENT AND TRADEMARK OFFICE
CERTIFICATE OF CORRECTION

PATENT NO. : 7,346,056 B2 Page 1 of 1
APPLICATION NO. : 10/061426
DATED : March 18, 2008
INVENTOR(S) : Bharathi B. Devi It is certified that error appears in the above-identified patent and that said Letters Patent is hereby corrected as shown below:

Column 4, Line 37, after "Constraints" delete "210" and insert -- 208 --.
Column 5, Line 55, after "$F$" delete "-" and insert -- = --.

Signed and Sealed this

Twenty-third Day of December, 2008

JON W. DUDAS
*Director of the United States Patent and Trademark Office*